Dec. 9, 1924.

C. D. DAVIS 1,518,311

DRAWBAR FOR TRACTORS

Original Filed Oct. 23, 1922

INVENTOR.
Charles D. Davis
BY
ATTORNEY

Patented Dec. 9, 1924.

1,518,311

UNITED STATES PATENT OFFICE.

CHARLES D. DAVIS, OF SACRAMENTO, CALIFORNIA.

DRAWBAR FOR TRACTORS.

Application filed October 23, 1922, Serial No. 596,311. Renewed October 27, 1924.

*To all whom it may concern:*

Be it known that I, CHARLES D. DAVIS, a citizen of the United States, residing at Sacramento, county of Sacramento, State of California, have invented certain new and useful Improvements in Drawbars for Tractors; and I do declare the following to be a full, clear, and exact description of the same, reference being had to the accompanying drawings, and to the characters of reference marked thereon, which form a part of this application.

This invention relates to improvements in drawbar attachments for tractors, especially designed for installation on tractors of the Fordson type, though it may also be adopted for use on other tractors as well.

The principal objects of my invention are to provide a drawbar device, designed to be easily and quickly installed on the tractor without having to make any alterations thereto, which will permit of turning of the tractor and its load in a very short radius, will allow the tractor to turn freely and easily even in loose soil or sand, and will eliminate its tendency to push forward when the front or steering wheels are cramped in a turn.

A further object is to provide means for enabling the drawbar itself, which is ordinarily free to swing, to be pinned at any desired off-center position, or at an angle to the longitudinal axis of the tractor, so that close cultivation to vines and trees is easily accomplished.

This feature also eliminates side draft even when the tractor is under a load, since the drawbar being connected to the tractor at a point on its longitudinal center line allows the load to move in the line of draft at all times.

I have also arranged to connect the attachment to the tractor in such a way that added traction is gained as the load is increased.

Still another object is to provide a platform structure on the attachment on which the operator may stand at his pleasure.

I have also designed the attachment so that it forms an effective preventive for the rearward tipping of the tractors of the light type, which is usually very evident when under load.

The drawbar itself however is connected to the tractor at such a point that this tendency is greatly lessened from that usually evident.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
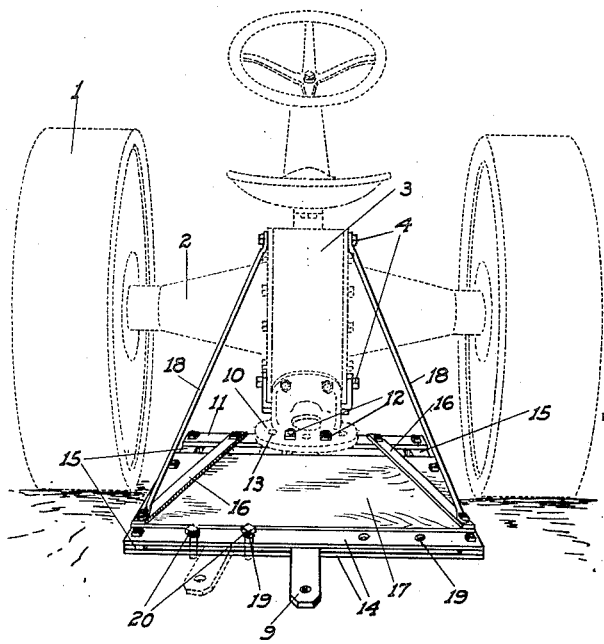
Fig. 1 is a perspective rear-end outline of a tractor of the Fordson type, showing my improved drawbar attachment installed thereon.

Referring now more particularly to the characters of reference on the drawings, the numeral 1 denotes the rear wheels of a tractor, mounted in connection with a housing 2 having an enlarged central portion 3 containing the usual driving and differential mechanisms, said portion 3 having a plurality of bolts or cap screws 4 spaced about its side faces.

My attachment comprises a U-shaped strap or yoke 5 arranged to partially straddle the differential housing 3 adjacent its forward end and to depend therebelow, and provided at its upper end with holes 6 adapted to receive certain ones of the bolts 4 therethrough.

Projecting rearwardly from the sides of the member 5 adjacent their lower ends are brace straps 7 provided at their rear ends with holes 8 likewise positioned to receive certain of the bolts 4 therethrough. This unit may thus be rigidly connected to the housing 3, the straps 7 acting to prevent rearward deflection of the member 5.

Pivoted centrally of the cross-bar of the yoke 5, which is also centrally of the width of the tractor, is a drawbar 9, extending rearwardly to a desired point beyond the wheels 1.

Positioned under the usual drawbar cap 10 of the tractor, which is attached to the rear end of the housing 3, is a rigid bar 11, extending transversely of the tractor, and which is secured to said cap by bolts 12 passing through certain of the holes 13 with which said cap is provided.

A certain distance to the rear of the bar 11 and beyond the rear face of the wheels 1 are vertically spaced bars 14, parallel to the bar 11, and which act as guides for the drawbar 9, the latter passing under the bar 11 and between said bars 14.

The bars 14 are rigidly connected to the bar 11 by longitudinal bars 15 which are positioned adjacent the ends of said bars and form a four-sided frame, the rigidity of which is insured by diagonal brace members 16.

A platform 17 extends between the bars 11 and 14, and is supported by the bars 15.

Connected to the frame and platform structure adjacent its rear end and outer edges are rods 18, which extend upwardly and forwardly to the housing 3, to which they are connected by means of sundry ones of the bolts 4.

The bars 14 have a plurality of holes 19 therethrough, spaced somewhat wider apart than the width of the drawbar 9, so that the latter may be swung off-center to lie between any of such holes, to be then held against movement by means of pins indicated at 20 in Fig. 1, inserted through said holes.

Figure 2:
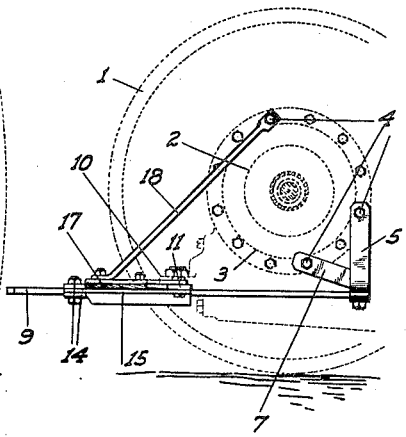
Fig. 2 is a side outline of the rear end of the tractor, showing the attachment mounted thereon.
Figure 3:
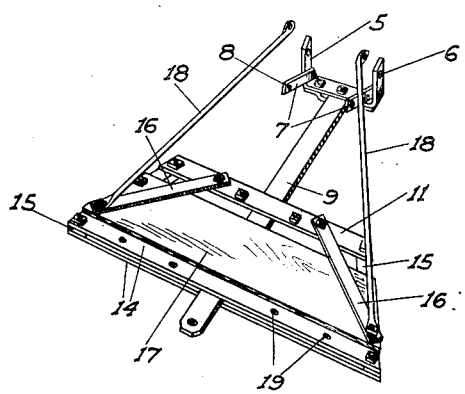
Fig. 3 is a perspective view of the attachment, detached.

The above description applies in its entirety to Figs. 1 to 3, and it is believed that it will be evident without further explanation that by means of this construction all the objects of the invention as set forth in the preamble will be attained.

Figure 4:
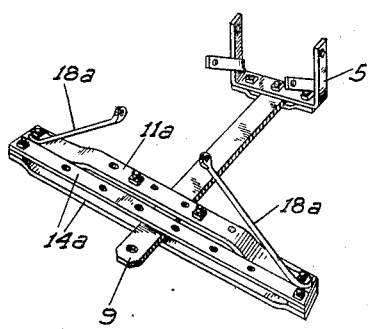
Fig. 4 is a similar view of a modified form of attachment.

In the type of attachment shown in Fig. 4, the same construction with regard to the attachment of the device to the tractor, and the operation of the drawbar, is employed, as above described. The platform however is omitted and the drawbar-guides 14ª are placed close to the bar 11ª making the attachment much shorter than the first described type, and shortening the supporting rods 18ª a corresponding extent. With this type, since it does not extend back of the wheels 1, the anti-tipping feature is missing, this being had in the first type by reason of the fact that as the tractor rises up at its front end, tending to turn backwardly about the centers of the wheels 1 as an axis, the bars 14 soon engage the ground, and prevent further tipping back of the machine.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A drawbar attachment for tractors comprising a yoke adapted to be attached to the rear axle housing of the tractor ahead of the axial line, a transverse and horizontal frame structure secured to the drawbar-cap of the tractor, and projecting rearwardly therefrom, brace members extending from the sides of the frame rearwardly of the cap to the housing secured thereto, and a drawbar pivoted on the yoke and projecting under the frame structure, and means on the latter for supporting the drawbar.

2. A drawbar attachment for tractors comprising a yoke having arms to rest against the opposed vertical faces of the rear axle housing of the tractor ahead of the axles and to be secured to the housing by certain of the bolts therein, the yoke projecting below the housing, a drawbar pivoted to the yoke below the housing and projecting rearwardly thereunder, and means for supporting the drawbar to the rear of the yoke.

3. A drawbar attachment for tractors comprising a yoke having arms to rest against the opposed vertical faces of the rear axle housing of the tractor ahead of the axles and to be secured to the housing by certain of the bolts therein, the yoke projecting below the housing, a drawbar pivoted to the yoke below the housing and projecting rearwardly thereunder, a horizontal frame structure attached to the drawbar cap of the tractor and projecting rearwardly therefrom, braces projecting up from the sides of the frame to the rear of the cap and extending to the side faces of the housing and attached thereto by certain of the standard bolts, and guide means for the drawbar carried by the frame.

In testimony whereof I affix my signature.

CHARLES D. DAVIS.